(12) United States Patent
Papageorgiou et al.

(10) Patent No.: US 10,200,240 B2
(45) Date of Patent: Feb. 5, 2019

(54) METHOD FOR CONFIGURING AN M2M SYSTEM

(71) Applicant: NEC EUROPE LTD., Heidelberg (DE)

(72) Inventors: Apostolos Papageorgiou, Heidelberg (DE); Ernoe Kovacs, Stuttgart (DE); Manuel Zahn, Riedstadt (DE)

(73) Assignee: NEC CORPORATION, Tokyo (JP)

( * ) Notice: Subject to any disclaimer, the term of this patent is extended or adjusted under 35 U.S.C. 154(b) by 594 days.

(21) Appl. No.: 14/890,165

(22) PCT Filed: Jan. 15, 2015

(86) PCT No.: PCT/EP2015/050692
§ 371 (c)(1),
(2) Date: Nov. 10, 2015

(87) PCT Pub. No.: WO2015/110348
PCT Pub. Date: Jul. 30, 2015

(65) Prior Publication Data
US 2016/0112256 A1    Apr. 21, 2016

(30) Foreign Application Priority Data

Jan. 22, 2014    (EP) ..................................... 14152095

(51) Int. Cl.
*H04L 12/66*    (2006.01)
*H04L 12/24*    (2006.01)
*H04L 29/08*    (2006.01)

(52) U.S. Cl.
CPC .......... *H04L 41/0806* (2013.01); *H04L 12/66* (2013.01); *H04L 41/0823* (2013.01); *H04L 67/12* (2013.01)

(58) Field of Classification Search
CPC . H04L 41/0806; H04L 41/0823; H04L 12/66; H04L 67/12
(Continued)

(56) References Cited

U.S. PATENT DOCUMENTS 6,515,957 B1    2/2003 Newns et al.
9,608,745 B2 *   3/2017 Iwai ......................... H04W 4/06
(Continued)

OTHER PUBLICATIONS

Emmanuel Darmois, et al., "Introduction to M2M", M2M Communications: A Systems Approach, First Edition, Dec. 2012, pp. 1-20.

*Primary Examiner* — James E Springer
(74) *Attorney, Agent, or Firm* — Leydig, Voit & Mayer, LTD.

(57) ABSTRACT

A method for configuring an M2M system having an M2M frontend with one or more gateways and an M2M backend includes specifying, by an operator entity, one or more commands to be achieved in said M2M system by the one or more gateways of the M2M frontend; specifying, by a stylesheet providing entity, one or more stylesheets for the one or more gateways of the M2M frontend representing information for interpretation of general gateway configurations for the one or more gateways; calculating, by a synergy description entity, one or more synergy descriptions representing an impact of one or more gateway operational parameters on the specified commands; calculating the general gateway configurations for a plurality of gateways by evaluating the synergy descriptions with respect to the specified commands by a configuration entity; and providing specific gateway configurations by applying the specified stylesheets on the general gateway configurations.

16 Claims, 9 Drawing Sheets

(58) Field of Classification Search
USPC .......................................................... 709/222
See application file for complete search history.

(56) References Cited

U.S. PATENT DOCUMENTS

| | | |
|---|---|---|
| 2005/0157730 A1 | 7/2005 | Grant et al. |
| 2006/0129518 A1 | 6/2006 | Andreev et al. |
| 2007/0220093 A1 | 9/2007 | Bracke et al. |
| 2012/0047551 A1* | 2/2012 | Pattar ...................... H04W 4/00 726/1 |
| 2013/0226998 A1* | 8/2013 | Heo ...................... H04L 67/303 709/203 |
| 2013/0227036 A1* | 8/2013 | Kang ...................... H04L 65/40 709/206 |
| 2014/0126581 A1* | 5/2014 | Wang ...................... H04W 4/70 370/431 |
| 2015/0067154 A1* | 3/2015 | Ly ......................... H04L 43/0876 709/224 |
| 2015/0088979 A1* | 3/2015 | Dong ...................... H04W 4/70 709/203 |
| 2015/0293540 A1* | 10/2015 | Izumihara ............. G05B 19/042 700/276 |
| 2016/0048596 A1* | 2/2016 | Papageorgiou .......... H04Q 9/00 707/740 |
| 2017/0085650 A1* | 3/2017 | Mungo .................. H04W 4/70 |

* cited by examiner

| Command-to-Command Correlation | Latency | Costs | Security | Domain priority | Scheduling / Synchronizing of data | M2M Data quality/accuracy | M2M Device/System diagnostics | M2M System maintainability | M2M Backend energy consumption |
|---|---|---|---|---|---|---|---|---|---|
| Latency | | 0.45 | -1.00 | 0.88 | 0.33 | -0.09 | 0.41 | -0.43 | 0.09 | -0.07 |
| Costs | 0.45 | | -1.00 | 0.40 | -1.00 | -0.71 | -0.27 | -0.67 | 0.60 | 0.40 |
| Security | -1.00 | -1.00 | | 0.00 | 0.50 | -0.20 | 0.33 | -1.00 | -0.78 |
| Domain priority | 0.88 | 0.40 | -1.00 | | 0.00 | 0.00 | 0.50 | -0.67 | 0.09 | -0.14 |
| Scheduling / Synchronizing of data | 0.33 | -1.00 | 0.00 | 0.00 | | 1.00 | 1.00 | 1.00 | -1.00 | -0.50 |
| M2M Data quality/accuracy | -0.09 | -0.71 | 0.50 | 0.00 | 1.00 | | 0.83 | 1.00 | -0.75 | -0.71 |
| M2M Device/System diagnostics | 0.41 | -0.27 | -0.20 | 0.50 | 1.00 | 0.83 | | 1.00 | -0.40 | -0.29 |
| M2M System maintainability | -0.43 | -0.67 | 0.33 | -0.67 | 1.00 | 1.00 | 1.00 | | -0.60 | -0.67 |
| M2M Backend energy consumption | 0.09 | 0.60 | -1.00 | 0.09 | -1.00 | -0.75 | -0.40 | -0.60 | | 0.60 |

Fig. 4

```
<Commands>
  <Costs>
    <TargetType>...</TargetType>
    <TargetLevel>...</TargetLevel>
    <Weight>...</Weight>
  </Costs>
  <BackendEnergyConsumption>
    <TargetType>...</TargetType>
    <TargetLevel>...</TargetLevel>
    <Weight>...</Weight>
  </BackendEnergyConsumption>
  <!--
    ............
    All operator's commands
    ............
  -->
  <AreaOfInterest>
    <CenterX>...</CenterX>
    <CenterY>...</CenterY>
    <Radius>...</Radius>
  </AreaOfInterest>
  <VerticalPriorities>
    <TargetType>...</TargetType>
    <TargetLevel>...</TargetLevel>
    <Weight>...</Weight>
    <Domains>
      <Safety>...</Safety>
      <Energy>...</Energy>
      <Automation>...</Automation>
      <Logistics>...</Logistics>
      <Home>...</Home>
      <Infrastructure>...</Infrastructure>
      <Automotive>...</Automotive>
    </Domains>
  </VerticalPriorities>
</Commands>
```

```xml
<InterpretableConfiguration>
  <SuggestedConfiguration>
    <General>
      <Compression> ... </Compression>
      <Filtering> ... </Filtering>
      <DataAggregationOnGW> ... </DataAggregationOnGW>
      <IntelCaptureInterval> ... </IntelCaptureInterval>
      <SchedulingScheme> ... </SchedulingScheme>
      <LoggingLevel> ... </LoggingLevel>
      <Monitoring> ... </Monitoring>
      <ProcessOptimization> ... </ProcessOptimization>
      <ComputationOffloading> ... </ComputationOffloading>
      <GWSelectionMechanism> ... </GWSelectionMechanism>
    </General>
    <Device>
      <CaptureInterval> ... </CaptureInterval>
      <WirelessInterfaceState> ... </WirelessInterfaceState>
      <SleepPhase> ... </SleepPhase>
      <DataAggregationOnDev> ... </DataAggregationOnDev>
    </Device>
    <Security>
      <EncryptionOnGW> ... </EncryptionOnGW>
      <EncryptionOnDev> ... </EncryptionOnDev>
      <WirelessSec> ... </WirelessSec>
      <SecVPNChannel> ... </SecVPNChannel>
      <IntegrityProtection> ... </IntegrityProtection>
    </Security>
    <Network>
      <PrefProtocol> ... </PrefProtocol>
      <PrefTransport> ... </PrefTransport>
      <EndpointAssignment> ... </EndpointAssignment>
      <DevFaultMgmt> ... </DevFaultMgmt>
    </Network>
    <Data>
      <Buffering> ... </Buffering>
      <PollingIntervals> ... </PollingIntervals>
      <Queuing> ... </Queuing>
    </Data>
  </SuggestedConfiguration>
  <ForwardedInput>
    <Geo>
      <CenterX>...</CenterX>
      <CenterY>...</CenterY>
      <Radius>...</Radius>
    </Geo>
    <Priorities>
      <Vertical>
        <Name> ... </Name>
        <Weight> ... </Weight>
      </Vertical>
      <Vertical>
        ...
      </Vertical>
    </Priorities>
  </ForwardedInput>
</InterpretableConfiguration>
```

T-GWC

Fig. 6

```
Compression
{
list-specific-devices:...;
supported-ordered-values:...;
value-range:...;
upper-limit:...;
lower-limit:...;
focus-vertical:...;
/* Parameter- or vendor-specific fields */
}
Filtering
{
list-specific-devices:...;
supported-ordered-values:...;
value-range:...;
upper-limit:...;
lower-limit:...;
focus-vertical:...;
/* Parameter- or vendor-specific fields */
}
/* ......... */
/* Any other parameter of the interpretable configuration */
InterpretableParameterX
{
list-specific-devices:...;
supported-ordered-values:...;
value-range:...;
upper-limit:...;
lower-limit:...;
focus-vertical:...;
/* Parameter- or vendor-specific fields */
}
General
{
/* Support of M2M-related technologies */
access-technologies:...;
m2m-protocols:...;
/* Handled data categories */
smallDataNum:...%;
largeDataNum:...%;
smallDataText:...%;
largeDataText:...%;
video:...%;
audio:...%;
/* Served M2M vertical industries*/
safety:...%;
energy:...%;
automation:...%;
logistics:...%;
home:...%;
infrastructure:...%;
automotive:...%;
other:...%;
/* Geo */
coordinates:...;
/* Vendor-specific fields */
<!-- ... -->
}
```

T-ANS

Fig. 7

```
DEFINITIONS
CE: List of classified entries, each list element consists of a CP entry and assigned commands
ES: List of entry scores, each list element consists of a CP entry and an assigned score of weights
_____
// Input:      CP         (table of commands and parameters)
// Input:      OT         (set of operator targets)
// Output:     IC         (interpretable configuration)

for all parameters p of CP
            // Step 1: Consideration of external factors
            if p depends on external factors
                        recalculateCP(p)
            end if
            // Step 2: Classification of commands
            Initialize CE
            for all commands c of OT
                        if CP[c][p] != null
                                    CE.add(CP[c][p],c)
                        end if
            end for
            // Step 3: Examination of the classified commands
            if CE.isEmpty()
                        IC.getParameter(p).setNoSuggestion()
            end if
            else
                        // Step 3a: Calculation of the most valuable entry
                        Initialize ES
                        for all entries e of CE
                                    ES.add(entry,CE.get(e).getSumOfWeights())
                        end for
                        mostValueableEntry = ES.getEntryWithHighestSumOfWeights()
                        // Step 3b: Consideration of parameter characteristics
                        if p consists of qualitative values
                                    IC.getParameter(p).setSuggestion(mostValueableEntry)
                        end if
                        else
                                    weights = 0, weightedScales = 0
                                    for all commands c of mostValueableEntry
                                                scale = calculateScale (c.getTargetType,
                                                            c.getTargetValue)
                                                weightedScale = AVG(scale) *
                                                            c.getWeight()
                                                weights += c.getWeight()
                                                weightedScales += weightedScale
                                    end for
                                    alignedTargetValue = weightedScales / weights
                                    IC.getParameter(p).setSuggestion(alignedTargetValue)
                        end else
            end else
end for
return IC
```

Fig. 8

```
DEFINITIONS
CC:           Table of command correlations, (Intermediate output) each table entry represents the
weighted, normalized correlation between two commands
BC:           List of commands (Intermediate output) representing the command combination with the best
complementary correl.
_____

// Input:     CP           (table of commands and parameters)
// Input:     OT           (set of operator targets)
// Output:    IC           (interpretable configuration)

// Step 1: Consideration of external factors
for all parameters p of CP
              if p depends on external factors
                            recalculateCP(p)
              end if
end for
// Step 2: Calculation of the command correlation table
maxAbsWeightedCorrelation = 0
for all commands baseCmd of OT
       for all commands vsCmd of OT
              be = |Base entries|              // amount of not empty entries in baseCmd
              ce = |Comparable entries|        // amount of comparable entries between baseCmd and vsCmd
              ee = |Equal entries|             // amount of equal entries between baseCmd and vsCmd
              normalizedCorrelation = (ee/ce-0.5) * (ce/be)
              pairWeights = baseCmd.getWeight() + vsCmd.getWeight()
              weightedCorrelation = (pairWeights/2) * normalizedCorrelation
              if |weightedCorrelation| > maxAbsWeightedCorrelation
                            maxAbsWeightedCorrelation = |weightedCorrelation|
              end if
              CC[baseCmd][vsCmd] = weightedCorrelation
       end for
end for
// Step 3: Normalization of the command correlation table
for all commands baseCmd of CC
              for all commands vsCmd of CC
                            CC[baseCmd][vsCmd] = CC[baseCmd][vsCmd] / maxAbsWeightedCorrelation
              end for
end for
// Step 4: Calculation of the command combination with the best correlation in O(2^n)
for all command combinations cc of OT
              aggregatedCorrelation = 0
              for all commands baseCmd of cc
                            for all commands vsCmd of cc
                                          aggregatedCorrelation += CC[baseCmd][vsCmd]
                            end for
              end for
              if aggregatedCorrelation > bestCorrelation
                            BC = cc
                            bestCorrelation = aggregatedCorrelation
              end if
end for
// Step 5: Continuation with CCA and the found best command combination
return CCA(BC)
```

Fig. 9

METHOD FOR CONFIGURING AN M2M SYSTEM

CROSS REFERENCE TO RELATED APPLICATIONS

This application is a U.S. National Stage Application under 35 U.S.C. § 371 of International Application No. PCT/EP2015/050692 filed on Jan. 15, 2015, and claims benefit to European Patent Application No. 14152095.7 filed on Jan. 22, 2014. The International Application was published in English on Jul. 30, 2015 as WO 2015/110348 A1 under PCT Article 21(2).

FIELD

The present invention relates to a method for configuring an M2M system comprising an M2M frontend with one or more gateways and an M2M backend.

The present invention further relates to an M2M system for performing with a method according to one of the claims 1-13, comprising an M2M backend and an M2M frontend with one or more gateways.

BACKGROUND

Machine-to-Machine (M2M) devices are in general devices that have a sensing, actuating, or any automated data-generating task that runs without human intervention and has connectivity to a backbone network, which aggregates and processes data from many sources. M2M systems, in turn, refer e.g. systems which are empowered by M2M devices, including an end-to-end platform for providing enhanced and homogenized access to the M2M data.

M2M is nowadays considered an integral part of the Internet-of-Things and has a wide range of application such as industrial automation, logistics, etc., not only for monitoring but also for control purposes.

Since for example when a new M2M application is launched new devices, gateway software modules or databases which are dedicated to this application and service needs are deployed. These so-called verticals "enrich" the M2M system through all levels reaching from M2M devices D to the applications A. The latest trends however suggest a transition towards so-called horizontals, i.e. configurable M2M platforms with technology abstraction layers, extended functionalities, etc. which continuously and proactively maintain knowledge and control of the physical world, providing an application programming interface API with which various types of new M2M applications A can be developed without the need of re-engineering the lower levels.

However one of the problems of these horizontal platforms is, that it is much more difficult for operators to maintain configurations covering their changing needs and serve their dynamic goals. The reason for that is that—compared to verticals—horizontals have the following characteristics: They serve various domains resulting in a bigger number of technologies to be supported, i.e. numerous and more complex configuration parameters. Further it is more difficult to know or to calculate configuration combinations satisfying current goals. A further problem is the usage of different type of gateways which need to be configured differently: A bigger system scale results in an increased workload for configuration maintenance and an increased probability to save costs. Further an increased degree of expertise is required by an operator in order to configure the M2M system efficiently. Even further various restrictions for the access to gateways and/or their configurations may be present since the might provided by third parties.

Conventional configuration methods usually rely on defining standard techniques for remote parameter settings. Another conventional method is to adapt automation approaches for autonomic computing, for example self-management, etc. Such conventional techniques for remote setting of system parameters, for example are being disclosed in US 2007 022 0093 A1 providing a remote configuration of gateway environments such as OSGi or in the non-patent literature of TR-069 Amendment 5, CPE WAN Management Protocol, Broadband Forum, 2013 showing a remote setting of gateway parameters.

However, these conventional methods cannot provide a higher degree of automation. Further active remote configuration suffers from the problem that the operations are unaware of the configuration. Further the heterogeneity of the gateways in the big system size cause problems when applying these conventional methods.

In U.S. Pat. No. 6,515,957 B1 a configuration of IP translation functions is shown. In US 2005/0157730 A1 an auto-configuration management of gateways in heterogeneous networks is shown. However these conventional methods are very strongly bound to the specific technology for example IP, IETF, iSCSI, i.e. they are not directed to M2M systems.

Further methods for autonomic computing are for example disclosed in the non-patent literature of Jeffrey Kephart and David Chess. The Vision of Autonomic Computing. Computer, 36(1):41-50, 2003 and M. B. Alaya, S. Matoussi, T. Monteil, and K. Drira, "Autonomic Computing System for Self-management of Machine-to-Machine Networks," in Proceedings of the 2012 international workshop on Self-aware internet of things, ser. Self-IoT '12. ACM, 2012, pp. 25-30. However the methods and systems disclosed therein suffer from the restrictions towards automating the configuration of gateways: Computing efficient gateway configurations centrally is inapplicable because of the heterogeneity of gateway technologies and the variability of gateway tasks.

SUMMARY

According to an embodiment, a method is provided for configuring an M2M system comprising an M2M frontend with one or more gateways and an M2M backend. The method includes specifying, by an operator entity, one or more commands to be achieved in the M2M system by the one or more gateways of the M2M frontend; specifying, by a stylesheet providing entity, one or more stylesheets for the one or more gateways of the M2M frontend representing information for interpretation of general gateway configurations for the one or more gateways; calculating, by a synergy description entity, one or more synergy descriptions representing an impact of one or more gateway operational parameters on the specified commands; calculating the general gateway configurations for a plurality of gateways by evaluating the synergy descriptions with respect to the specified commands by a configuration entity; and providing specific gateway configurations by applying the specified stylesheets on the general gateway configurations by a gateway management entity.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 4 shows a correlation table according to a third embodiment of the present invention;

FIG. 5 shows a template of a part of a fourth embodiment of the present invention;

FIG. 6 shows a template of a part of a fifth embodiment of the present invention;

FIG. 7 shows a template of a part of a sixth embodiment of the present invention;

FIG. 8 shows a part of a method according to a seventh embodiment of the present invention; and FIG. 9 shows a procedure according to a method according to an eighth embodiment of the present invention.

DETAILED DESCRIPTION

Figure 1:
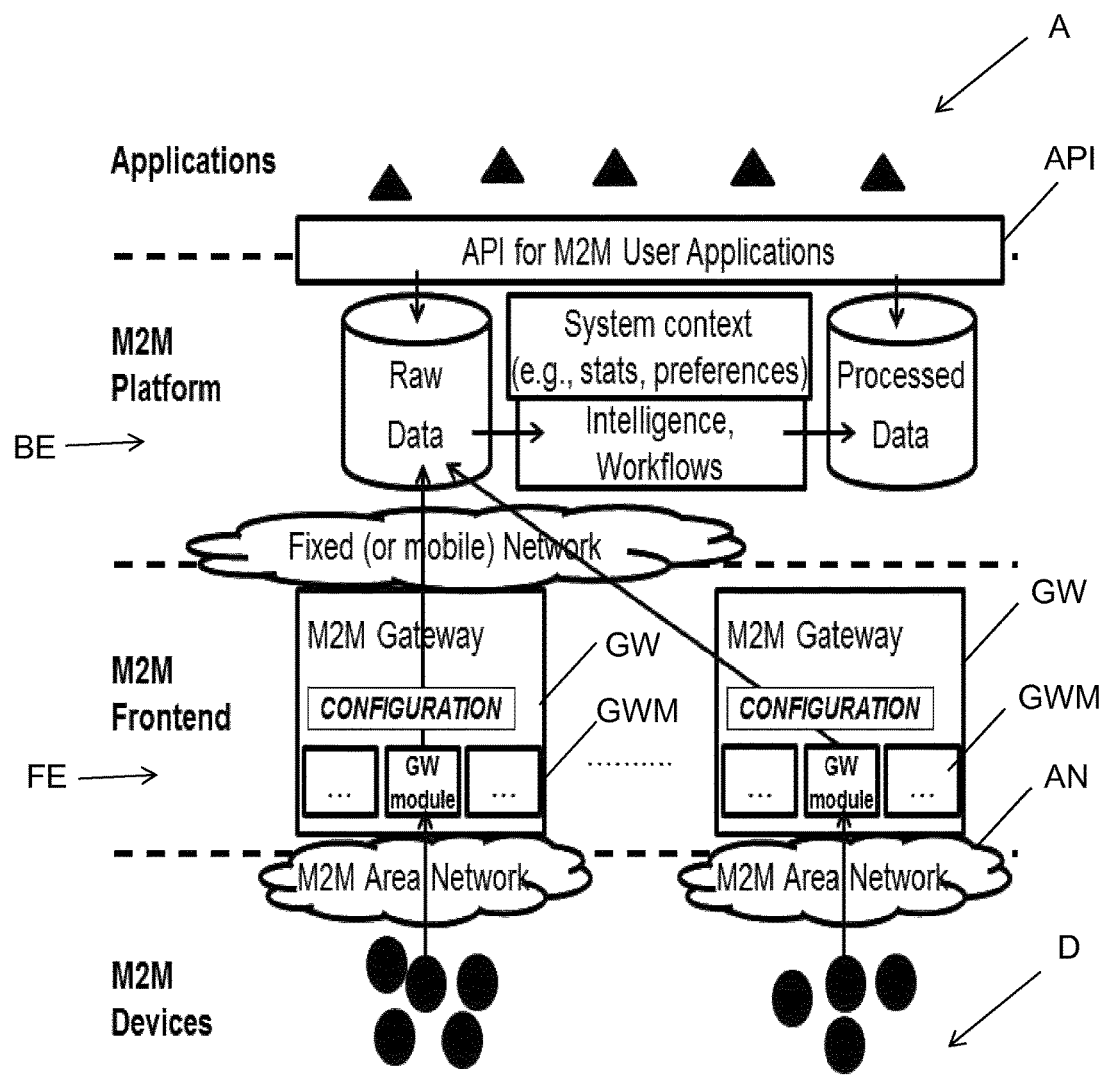
FIG. 1 shows schematically a conventional M2M system.

An embodiment of the present invention provides a method for configuring an M2M system and an M2M system enabling a bigger degree of automation for an M2M system configuration.

An embodiment of the present invention provides a method for configuring an M2M system and an M2M system enabling a more educated and more specific configuration while being efficient and easy-to-implement.

An embodiment of the present invention provides a method for configuring an M2M system and an M2M system enhancing the flexibility when configuring in particular gateways while providing more specific configurations for example for gateways.

In an embodiment, a method for configuring an M2M system comprising an M2M frontend with one or more gateways and an M2M backend is provided. The method includes:

a) Specifying by an operator entity for said gateways one or more commands to be achieved in said M2M system by said one or more gateways of the M2M frontend (FE), b) Specifying by a stylesheet providing entity one or more stylesheets for said gateways of the M2M frontend representing information for interpretation of general gateway configurations for said gateways, c) Calculating by a synergy description entity one or more synergy descriptions representing an impact of one or more gateway operational parameters on said specified commands, d) Calculating said general gateway configurations for a plurality of gateways by evaluating said synergy descriptions with respect to said commands by a configuration entity like a file server, and e) Providing specific gateway configurations by applying the specified stylesheets on the determined general gateway configurations by a gateway management entity.

In an embodiment, an M2M system for performing with a method is provided that includes an M2M backend and an M2M frontend with one ore more gateways. The system includes:

a) an operator entity adapted to specify for said gateways one or more commands to be achieved specified by values of one or more gateway operational parameters, b) a stylesheet providing entity adapted to specify one or more stylesheets for said gateways of the M2M frontend representing information for interpretation of general gateway configurations for said gateways, c) a synergy description entity adapted to calculate one or more synergy descriptions representing an impact of one or more gateway operational parameters on said specified commands, d) a configuration entity adapted to calculate said general gateway configurations for a plurality of gateways by evaluating said synergy descriptions with respect to said commands, preferably wherein the configuration entity is a file server, and e) a gateway management entity adapted to provide specific gateway configurations by applying the specified stylesheets on the determined general gateway configurations.

In an embodiment, a synergy description entity adapted to determine one or more synergy descriptions representing an impact of one or more gateway operational parameters of one or more gateways of an M2M frontend on specified commands to be achieved specified by values of said one or more gateway operational parameters is provided.

Further a gateway management entity adapted to provide specific gateway configurations by applying specified stylesheets representing information for interpreting of general gateway configurations for M2M gateways on determined general gateway configurations for M2M gateways is provided.

The term "command" can be understood in general as preferences, goals, targets e.g. of a platform operator, and for example as command to be performed on an M2M system.

Figure 3:
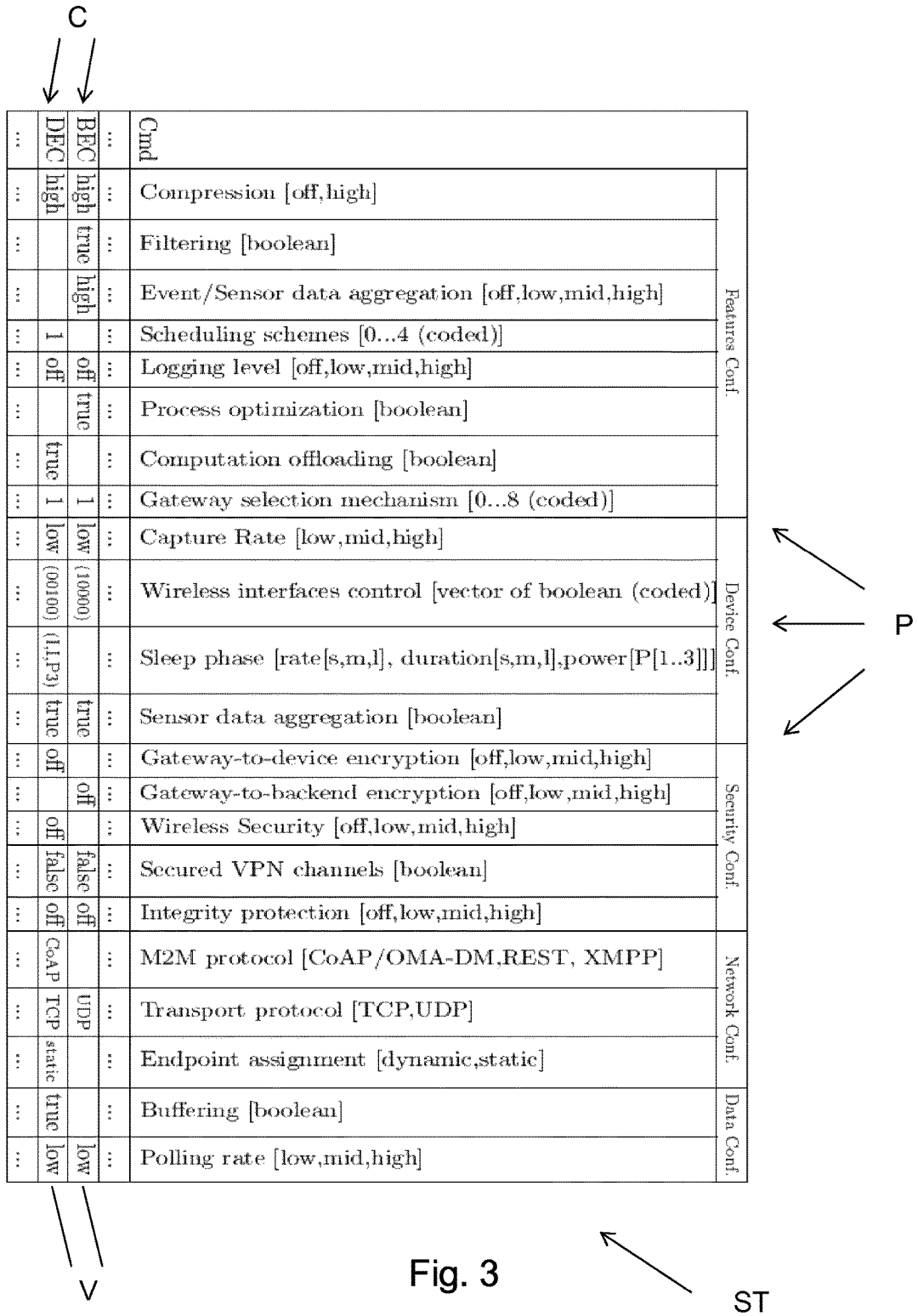
FIG. 3 shows a synergy table according to a second embodiment of the present invention.

The term "gateway operational parameter" can be understood as a parameter relevant for operating a gateway which can be adjusted during operation of the gateway to influence the behavior, performance or the like of the gateway. Examples of gateway operational parameters are shown in FIG. 3 below.

According to an embodiment of the invention it has been recognized that a bigger degree of automation for an M2M platform configuration can be enabled due to an appropriate distribution of auto-configuration tasks between backend and frontend.

According to an embodiment of the invention it has been further recognized that a more educated and more specific auto-configuration decisions are enabled due to the synergies between command and parameters which are taken in account during the auto-configuration.

According to an embodiment of the invention it has been further recognized that the need for a "one action fits all principle" for the automated auto-configuration actions can be avoided.

According to an embodiment of the invention it has been even further recognized that the configuration task between an M2M backend and an M2M frontend can be distributed between them enabled in turn by gateway-independent suggestions which are interpreted by the stylesheets.

According to an embodiment of the invention it has been even further recognized that suggested configurations based on synergies appearing in M2M system between system parameters and M2M commands may be computed.

In other words the use of so-called intermediate, non-final configurations enables the aforementioned benefits. The use of stylesheets for interpreting the intermediate configurations enable an inclusion of attributes like "supported M2M technologies", "value ranges and limits", "handled data types", "served M2M verticals" and geographic information" for example as content of these styles or in other words of "high level" or abstract attributes. By "transferring" the responsibility of concretizing certain aspects to each of the gateways the backend is enabled to provide gateway-independent configurations which are aligned to system wide operator goals.

Further features, advantages and preferred embodiments are described in the following subclaims.

According to a preferred embodiment commands are generated by command description means including a prioritization of verticals and/or geographic information for gateways. This enables e.g. to determine or specify which gateways have to take into account the interpretable configuration that will be computed.

According to a further preferred embodiment the commands are auto-generated, preferably by a GUI for the operator. This enables in a simple way to allow an operator to set system goals, prioritized and launched platform commands, manually update known parameter synergies, etc. by the GUI. When specified by the GUI the commands when automatically generated provide an efficient way to provide the commands based on inputs of an operator. For example the GUI transforms a manual input of an operator into machine-readable descriptors like a command descriptor and a parameter synergies descriptor. For example the GUI may provide a map-based area selector enabling a transformation to an "area-of-interest"-parameter of the command descriptor and/or provide drop-down lists for making selections that will be transformed to the prioritized commands of the command descriptor.

According to a further preferred embodiment for determining a gateway general configuration said commands are weighed and/or a target level to be achieved is determined for said commands. Weighing and/or determining a target level provides in a simple but efficient way an enhanced flexibility since different commands can be weight and combined with each other. Determining a minimum target level to be achieved provides in a simple and efficient way to specify a desired level of a specified target to be achieved.

According to a further preferred embodiment the most valuable entry is determined for each gateway operational parameter for said commands. This provides in an efficient way parameters for the so-called intermediate gateway configurations since the most promising values for each gateway parameter to satisfy the commands are selected to define the intermediate interpretable configurations.

According to a further preferred embodiment the most valuable entry of each gateway operational parameter for each of said command is selected based on the highest value for each gateway operational parameter throughout all said commands. This enables very efficiently to determine the most valuable entry for the intermediate interpretable configuration, i.e. a general gateway configuration.

According to a further preferred embodiment the most valuable entry is calculated based on the target level to be achieved and the corresponding weight for each command. This allows a more educated and more specific decision for the most valuable entry due to the weighing and the target level to be achieved.

According to a further preferred embodiment each command is sorted based on its weight and based on the list of sorted commands in descending order with the first command in the list having the highest weight the corresponding value for the gateway operational parameter not already determined is chosen for each of said command to determine the gateway general configuration. This enables a weight ranking based optimization of the intermediate interpretable configuration generation, i.e. of the general gateway configuration According to a further preferred embodiment:
aa) Target achievement values—TAV—for each command are calculated, and
bb) based on said TAV for each command one or more of the values of gateway operational parameters are selected,
cc) one or more degrees of target achievement—DTA— are calculated,
dd) for each command the calculated degree and said corresponding TAV are compared,
ee) based on the comparison the command having the maximum difference between calculated DTA and TAV is selected which has not been already selected,
ff) calculation of benefits for the values of the gateway operational parameters for the selected commands,
gg) selecting the value of the corresponding gateway operational parameter having the highest benefit as value for the gateway operational parameter for the gateway general configuration,
hh) perform steps cc)-gg) with the non-selected commands so far as long as all values for all gateway operational parameters have been determined to define the gateway general configuration.

This enables a fair dynamic leveling of target achievement agrees under consideration of the target level.

According to a further preferred embodiment when calculating the DTA weights of the corresponding commands are included. This enables an even more fair and dynamic leveling of the target achievement degrees taking into account the weights of the commands.

According to a further preferred embodiment prior to step d) correlations between each of two commands are calculated and negative correlating commands are filtered. This enables to avoid commands for achieving the targets which contradict each other providing a faster determination of an intermediate interpretable configuration.

According to a further preferred embodiment prior to step d) correlations between each of two commands are calculated and the best one or more commands having the highest correlation are selected for performing steps d)-e) to achieve said targets. This allows in an efficient way to select the most promising commands for fulfilling the targets of an operator.

According to a further preferred embodiment external influences of gateway operational parameters are included when determining said synergy descriptions. This may be performed prior to determine a first synergy description table for example or—when already a synergy description is present—this synergy description can be recalculated based on these external factors. This allows in an efficient way to include dependencies of the gateway parameters on external factors and to adjust the synergy descriptions accordingly. External factors may for example be limited available power, limited bandwidth or varying bandwidth or the like.

According to a preferred embodiment of claim 14 the operator entity, the synergy description entity and the configuration entity are located in or connected to the M2M backend and the stylesheet providing entity and the gateway management entity are located in the M2M frontend. This allows efficiently distributing the tasks for providing the interpretable intermediate configurations and the corresponding interpretations between the backend and the frontend of an M2M system.

According to a further preferred embodiment the data exchange between frontend and backend is encrypted. This enhances the security.

FIG. 1 shows schematically a conventional M2M system. In FIG. 1 a conventional M2M system is shown as a high-level view of most conventional major implementations and reference architectures of standardization bodies like ETSI M2M or OneM2M. As shown in FIG. 1 M2M devices D communicate with M2M data gateways GW via an M2M area network AN. The gateways GW receive and forward the information to an M2M backend BE where the data stored and provided to M2M applications A, preferably homogenized and/or smartly enriched. The information provided by the M2M devices D is captured, collected, organized, processed and forwarded by way of the configuration of the M2M gateways GW in particular of the corresponding gateway modules GWM. This configuration of the M2M gateways needs to be maintained at a state that best covers the needs and serves the goals of the entire M2M system.

The gateways GW are located in a M2M frontend FE. M2M devices D are connected via an M2M area network AN to the M2M gateways GW. Via a fixed or mobile network the M2M gateways GW are connected to an M2M platform also called backend BE comprising a raw data database, which provides system context like stats, preferences or the like as well as intelligence and workflows to obtain processed data of the raw data. An application programming interface API for M2M user applications provides an interface between the applications A and the backend BE. The applications A access via the API either the raw data and/or the processed data for further processing. The way the information is captured, collected, organized, processed and forwarded is based on the gateway GW configurations.

Figure 2:
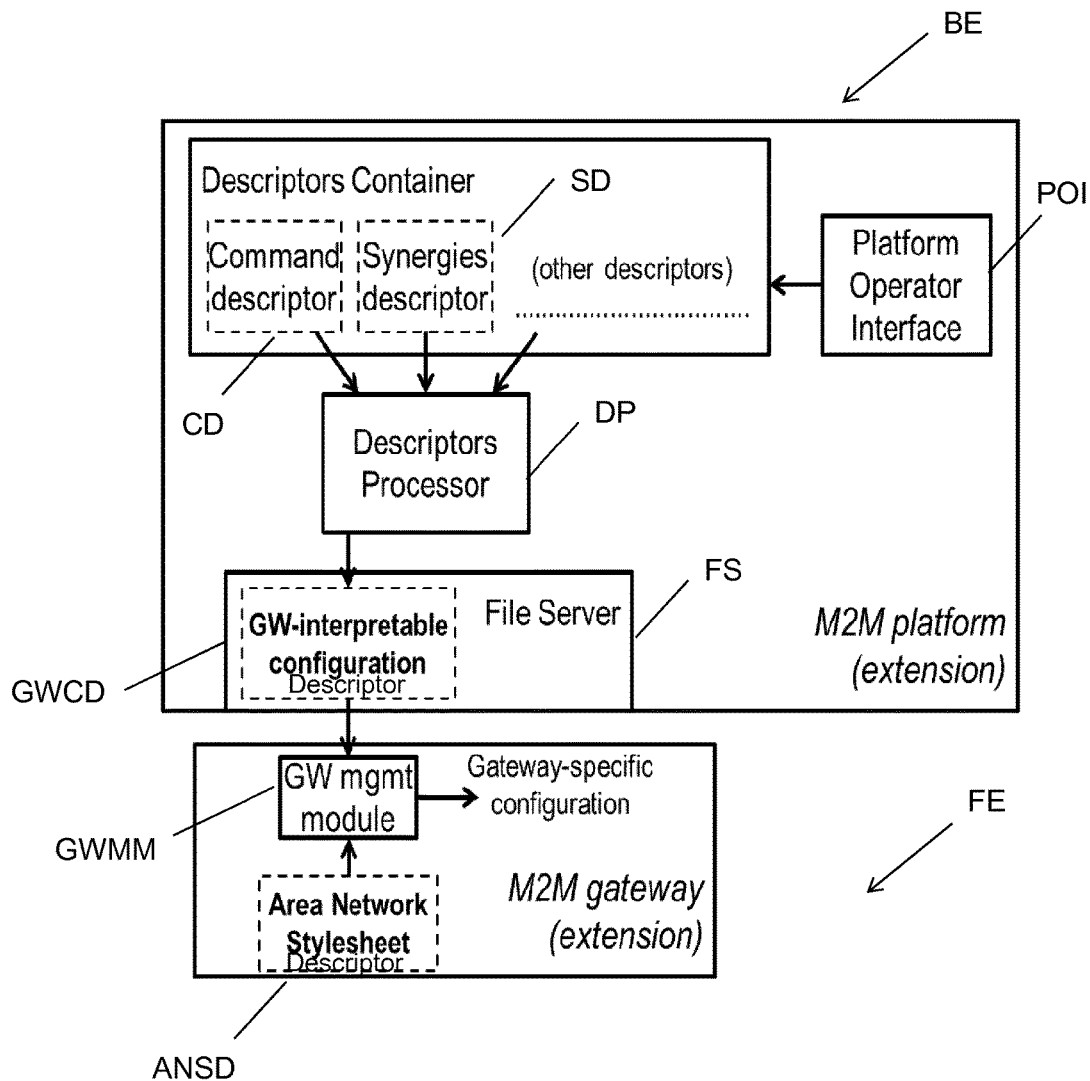
FIG. 2 shows parts of a method according to a first embodiment of the present invention.

FIG. 2 shows parts of a method according to a first embodiment of the present invention.

In FIG. 2 part of a backend BE and of a frontend FE is shown. The backend BE comprises a platform operator interface POI providing an interface for a descriptor's container comprising a command descriptor CD and a synergy descriptor SD. Other descriptors may also be provided. Each of the descriptors CD, SD provides description for a descriptor's processor DP, which computes one or more interpretable gateway configurations. This gateway interpretable configuration GWC is provided to a gateway management module GWMM in the M2M frontend FE after passing a gateway-interpretable configuration descriptor GWCD in a file server FS, located in the M2M backend BE. As a further input the gateway management module GWMM is provided with an area network stylesheet ANS for interpreting the gateway interpretable configuration GWC to come to gateway specific configurations.

In FIG. 2 the gateway management module GWMM as well as the area network stylesheet generator ANSD are located in the M2M gateway GW. However, these modules can also be moved to or located at the M2M backend BE. Also other modules like descriptors, processors, etc. may be moved between the M2M gateway GW or the M2M frontend FE respectively and the M2M platform or backend BE respectively. The file server FS may be replaced by any information exchange entity providing information exchange mechanisms like E-mail, webservice, calls, etc.

In the following the command descriptor CD, the platform operator interface POI, the descriptor's processor DP and the gateway management module GWMM is described in more detail: The M2M-specific descriptors, like a commend descriptor CD, synergies descriptor SD, an area network stylesheet ANS, descriptor as well an interpretable configuration descriptor GWCD providing the gateway interpretable configuration GWC is described:

The command descriptor CD representing prioritized commands and preferences of a platform operator provides input to a descriptor's processor DP computing the intermediate gateway configuration, i.e. the gateway interpretable configuration GWC respectively. The command descriptor CD may comprise a prioritization of verticals and/or a radius-based geographic area of interest which determines which gateways should apply or take into account the gateway interpretable configuration GWC that will be computed.

The (parameter) synergies descriptor SD represents or provides the impact of specific gateway parameters towards the achievement of specific platform goals. The synergies descriptor SD preferably generates a table comprising one row for each possible command entry of the command descriptor CD and one column for each gateway operational parameter entry of the gateway-interpretable configuration GWC.

The gateway-interpretable configuration descriptor GWCD is located in the M2M backend BE representing a description of the gateway-independent gateway configuration as suggested dynamically by the M2M backend BE.

The area network stylesheet descriptor ANSD is located in the M2M frontend FE assisting the interpretation of gateway-interpretable configurations on the gateways GW preferably similar to the way a CSS assists the HTML code in producing webpages. In particular and with reference to FIG. 7: The general attribute "coordinates" enables to correlate the gateway GW to certain interpretable configurations that are suggested by the M2M backend BE. These stylesheets ANS can be possibly uploaded to the M2M backend BE together with the gateway management module GWMM in order to perform the interpretation of the interpretable configuration descriptor GWCD there. The M2M backend BE may also implement an "interpretation logic" as well as a procedure for "remote parameter setting" for all gateways GW. As depicted in FIG. 2 the backend BE and the frontend FE enable keeping the aforementioned logic and mechanism gateway-internal or proprietary.

The platform operator interface POI preferably includes a graphical user interface GUI that the operator can use in order to said system targets, priorities and launch backend commands, manually updated known parameters, synergies, etc. The platform operator interface POI transforms then the operator's manual input into machine-readable descriptors, i.e. inter alia the command descriptor CD and the synergies descriptor SD. For example the platform operator interface POI might comprise a map-based area selector, so that the selection is transformed to the "area-of-interest" parameter of the command descriptor CD and drop-down list for making selections that will be transformed to the prioritized commands of the command descriptor CD.

The descriptor's processor DP takes the output of the command descriptor CD, the parameter synergies descriptor SD and possibly further descriptors as input and computes the suggested interpretable gateway configurations GWC. The internal logic for a computing or determining suggested values for gateway operational parameters can be based on different procedures. Two of them are shown in FIG. 8 and FIG. 9 below.

The gateway management module GWMM calculates final configuration values for its parameters by interpreting the suggestions of a gateway interpretable configuration GWC based on its area networks descriptor ANSD. The gateway management module GWMM can operate in the M2M frontend FE or operate inside the M2M backend BE. In this case it is also possible to consider the stylesheets as further input for the descriptor's processor DP, then the step of providing an interpretable configuration by the descriptor's processor DP may be hide, so that the descriptor's processor DP may produce the final, i.e. the gateway-specific configurations for the M2M gateways GW.

FIG. 3 shows a synergy table according to a second embodiment of the present invention.

FIG. 3 shows synergies between commands C and parameters P as part of the knowledge base. FIG. 3 shows therefore a synergy table ST with rows representing the different commands C of the command descriptor CD and one column for each parameter P of the possible gateway operational parameters. Each parameter P has then for each command C a corresponding value V, for example the command BEC defining the backend energy consumption has a "high" value for the gateway operational parameter "compression", "filtering" is provided ("true"), "event/sensor data aggregation" is "high", no "scheduling schemes", no "logging level" ("off"), "process optimization" is provided ("true"), no "computation offloading", for "gateway selection mechanism" "1" is applied, a "capture rate" is "low", etc. The values V may be Boolean or representing ranges like low, mid or high as well as numbers, for example specifying a value between 0 and 100.

In more detail:
Rows correspond with possible operator targets including a specification of the target type (rows of this table are also called commands).
Columns correspond with configurable gateway parameters.
Commands and parameters are clustered according to categories that indicate their scope.
A synergy for a certain command-parameter pair might or might not exist.
The possible values (or, better, coarse-grained value suggestions) for each parameter are listed (or implied) in square brackets next to the parameter name.
The values in the boxes indicate the value of the parameter that is most appropriate for achieving the given target type of the respective command.

Explanations for energy-related operator targets are provided in the following per parameter category, denoting the Backend Energy Consumption target as BEC and the Device Energy Consumption target as DEC:

Feature Configuration: Compression can reduce the traffic in an M2M system. For BEC, compression of well compressible data usually leads to server energy reduction. For DEC, depending on an aligned polling rate and inactivity timers of a wireless interface, compression is able to reduce the energy consumption of mobile devices.

Filtering is used for the smart removal of less important data at gateway level. For BEC, activated filtering reduces incoming data which the backend BE has to receive, process, and store in data centers. As a consequence, the demand for energy is shrinking. Event- and sensor-data aggregation on gateways enables retention and compact transfers of delay-tolerant data. Thus, for BEC, data aggregation can reduce energy consumption. Device-aware scheduling scheme for delay-tolerant data should be used for DEC, because delay-tolerant transmissions can be scheduled in order to use less energy-expensive sensors and to wait for better signal in movement scenarios. Such a scheduling reduces the energy consumption in mobile devices.

The logging level determines the recording ratio of potential meaningful parameters. Both for BEC and DEC, logging needs additional (computing and networking) resources and therefore additional energy. Process optimization is the management of multiple M2M devices by single operations. In this way, traffic, computing resources and eventually energy can be saved for BEC. Device computation offloading refers to the outsourcing of device computations to the gateway. Computation offloading can reduce DEC. Further, when access to specific M2M devices can be provided through multiple gateways, a latency-based gateway selection mechanism is preferably performed. For BEC, lower latency means less waiting time for server resources, which in turn means less resource utilization and finally results in less energy consumption. For DEC, latency reduction in mobile devices implies shorter durations of active wireless interfaces and hence less energy consumption.

Device Configuration: The capture rate indicates how frequently the device sensors capture data. For BEC, a decrease of the capture rate has the following implication: An equal decrease of the data that has to be transferred, processed, and stored can lead to energy consumption savings (see explanation above). For DEC, a lower sensor sampling rate definitely reduces the energy consumption. For instance, a mobile device is typically equipped with several wireless interfaces, e.g., Bluetooth, WiFi. The control of wireless interfaces refers to their activation and deactivation. For BEC, the wireless interfaces with the lowest latency should be used. Less latency means less waiting time for server resources, which in turn means less resource utilization and can finally result in less energy consumption. For DEC, the most energy-efficient wireless interface for its purpose should be chosen. The list of possible suggestions is in this case still very coarse-grained and based on the assumption that a gateway can characterize the wireless interfaces by itself. The sleep phase encompasses the adjustable configuration parameters of the device regarding the energy-saving states. For DEC, long and intensive sleep phases can obviously reduce the energy consumption of the device. Sensor data aggregation enables retention and compact transfers of delay-tolerant data between device and gateway. Both for BEC and for DEC, data aggregation can help.

Security Configuration: Encryption can be used between device and gateway and also between gateway and backend. For BEC, encryption needs additional computing resources and thus it increases the energy consumption of computers. For DEC, encryption causes higher delay and therefore later triggered inactivity timers. Furthermore, additional computing resources are required. This results in increased energy consumption of mobile devices. Wireless security represents the security level of the wireless connection between device and gateway. For DEC, the additional security layer increases the latency and also the demand for computing resources. This yields in later triggered inactivity timers and concludes in extra energy consumption. Thus, the use of security levels in low-power WLAN nodes cause additional energy consumption. Further, the IEEE 802.15.4 security levels are responsible for additional energy consumption. For both BEC and DEC, the use of secured channels via VPN implies higher delay and more computing resources, so VPN increases the energy consumption, especially for M2M devices due to later triggered inactivity timers. Integrity protection and validation checks the alteration of the sensor data. For both BEC and DEC, integrity operations need additional computing resources and hence additional energy. The intensive usage of hash functions is required during the entire integrity operations. However, different hash functions exhibit different supplementary energy consumption.

Network Configuration: The M2M protocol refers to the suggested communication protocol in case protocols like CoAP, REST, XMPP, MQTT etc. can be alternatively used. According to the comparison, CoAP is much more appropriate than the others for low-power networks. This is also supported by the fact that CoAP is a lightweight alternative of REST, while XMPP has bigger message sizes and more overhead than CoAP. Thus, for DEC, CoAP is more appropriate. The Transport layer protocol is usually TCP or UDP. For BEC, TCP data transfers consume more energy due to the complexity of TCP structure. As for DEC, it has been determined that UDP data transfers cause higher device energy consumption compared to TCP data transfers. Endpoint assignment describes the method used for addressing. For DEC, dynamic IP addressing is more energy-consuming than static IP addressing when the devices are equipped with WLAN capabilities.

Gateway Configuration: Another gateway option is buffering for sleeping devices. The option enables longer sleep phases and less energy consumption of M2M devices, thus it is better for DEC. The Polling rate describes the frequency of data fetching operations between the gateway and the devices. Both BEC and DEC are obviously favoured by lower polling rates.

FIG. 4 shows a correlation table according to a third embodiment of the present invention.

In FIG. 4 correlations between commands C are shown. The correlations have been computed for equally weighted commands C. The command correlation table comprises the correlation CR of commands C among each other. The computation for each correlation table entry CR incorporates the amount of base, comparable and equal entries of the synergy table for a "first command" compared with a "versus command". In FIG. 4 the weights as already mentioned have been set equal for all commands C. Of course different weights of commands may be considered. This correlations CR can be used to filter negative correlating commands and/or to select the best correlated command combination for determining interpretable gateway-configurations GWC.

FIG. 5 shows a template of a part of a fourth embodiment of the present invention.

In FIG. 5 a template for a command descriptor T-CD is shown. The template T-CD enables to assign target details and weights to possible targets or goals of the operator. The corresponding values can be generated, for example by a graphical user interface GUI. Further FIG. 5 shows additional info for the area of interest as well as a prioritization of verticals. The area of interest is used to specify the geographic area for which the interpretable gateway configurations GWC should be applied.

FIG. 6 shows a template of a part of a fifth embodiment of the present invention.

In FIG. 6 a template of gateway interpretable configuration T-GWC is shown. The template T-GWC comprises a "suggested" configuration, i.e. interpretable suggested values for each parameter P and based on this interpretable configuration allows to instantiate it via one or more procedures. In FIG. 6 the prioritization of verticals to the interested or affected gateways GW is included.

FIG. 7 shows a template of a part of a sixth embodiment of the present invention.

In FIG. 7 a template T-ANS of an area network stylesheet ANS is shown. This template comprises details to be specified for translating the interpretable suggestions into gateway-specific parameter values. For example value-ranges, vertical priorities, exceptions, i.e. parameters or control devices that should not be configured, etc. may be specified when filling in these values into the template T-ANS.

FIG. 8 shows a part of a method according to a seventh embodiment of the present invention.

In FIG. 8 a procedure for determining or computing a suggested interpretable gateway configuration is shown. The procedure comprises inter alia the following steps performed for each gateway operational parameter P:

1. Dependencies of a gateway parameter on external factors lead to a recalculation of the knowledge base, i.e. the synergy table ST. External factors refer to any extra information that might require adaptation of some values of the table of FIG. 3. For example, the operator might know that—in its specific system—only "non-compressible" data is handled, so that the influence of compression-related gateway parameters must be removed from the table off FIG. 3. This step can be regarded as optional.
2. All commands from the operator targets (cf. FIG. 5) are classified in accordance with the knowledge base/synergy table ST entries. More concretely, each of the commands C is registered together with the value (of the currently examined parameter) that satisfies its target, e.g., in a vector such as (command, "off"; command2, "high"; . . . ; commandX, "off").
3. The classified commands are examined A suggestion can only be made if the knowledge base provides at least one filled entry.
   a. Based on the weights of the operator targets, the most valuable entry MVE is calculated. Out of the possible parameter values, the MVE will be the one with the highest $\Sigma_i^n w_i$ (where n is the number of appearances of the value in the vector of Step 2. and $w_i$ is the weight of the respective command).
   b. The parameter characteristics are considered. For qualitative values, the MVE is suggested directly. In case of quantitative values, the final suggestion is computed based on a compromise: scales of the MVE are calculated for each command. A scale is an interval, which is derived from TargetType and TargetLevel of the operator targets. The TargetType defines the comparative operator, e.g. static synergy (=), maximum synergy (≤), minimum synergy (≥), adaption (≤) etc. The TargetLevel defines a value between 0% and 100%. Building on that, a TargetValue can be calculated as product of the TargetLevel and the actual MVE value. The combination of TargetType and TargetValue yields in a scale. The scales are weighted in order to address the importance of the commands Finally, the weighted commands are normalized. The resulting aligned target value represents the suggestion for this gateway parameter.

FIG. 9 shows a procedure according to a method according to an eighth embodiment of the present invention.

In FIG. 9 a further procedure for calculating gateway-interpretable configurations GWC is shown based on the idea that typically not all commands can be sufficiently satisfied. A large amount of commands C intensifies this effect. Therefore an optimal complementary correlation can be reached by a removal of rivaling commands. FIG. 9 therefore shows inter alia the following steps:

1. Dependencies of the gateway parameters on external factors are considered in terms of a recalculation of the knowledge base as also shown in FIG. 8.
2. A command correlation table is computed. This table contains the correlation of the commands among each other. The computation for each table entry incorporates the amount of base, comparable and equal entries of the knowledge base/synergy table for a "base command" compared with a "versus command". The weights of both commands are considered.
3. The command correlation table is normalized. For example, FIG. 4 shows a part of the correlation table if the operator has provided all commands, and thus with the same weight.
4. The command combination with the best correlation is determined. The respective calculation accumulates the command correlations for the specific command combination. Hence, a combination with more commands is rewarded due to an $n^2$-n relation.
5. These steps pass the ascertained best command combination to the steps in FIG. 8 and then the steps of FIG. 8 are executed for this command combination.

The present invention enables the use of intermediate, non-final configurations which can be interpreted by gateways of an M2M system. This is in contrast to any conventional auto-configuration techniques which rely on protocols for direct remote setting of gateway parameters. The present invention enables a transfer of the responsibility of concretizing certain aspects for configuration to the gateway itself and the backend becomes able to suggest gateway-independent configurations being aligned to system-wide operator goals.

The present invention further enables the use of machine-readable styles for interpreting intermediate gateway configurations as well as the inclusion of attributes about "supported M2M technologies", "value ranges and limits", "handled data types", "served M2M verticals", and/or "geographic information" as part of the content of the stylesheets which is in contrast to conventional stylesheets for abstracting formatting and presentation details from web content. These machine-readable stylesheets for M2M gateways cannot be identical for different gateways but are in most cases similar and they are related to aspects such as supported technologies, controlled devices, etc.

The present invention further enables M2M-specific distributions of auto-configuration tasks between an M2M backend and an M2M frontend. Appropriate distribution of the task is enabled in turn by the idea of gateway-independent suggestions which are interpreted by area network stylesheets. The present invention further enables a computation of the suggested configurations based on synergies appearing in M2M systems between system parameters and M2M commands.

The present invention has inter alia the following advantages: The present invention enables a bigger degree of automation for M2M platform configurations due to appropriate distribution of the auto-configuration task between backend and frontend. The present invention further enables more educated and more M2M-specific auto-configuration decisions due to the way the synergies between commands and parameters are taking into account during the auto-configuration process. Even further the present invention enables an avoidance of the need for "one (action) fits all (gateways)" for the automated auto-configuration actions.

A system facilitating the automation of M2M gateway configurations by extending conventional systems with auto-configuration support modules and machine-readable descriptors of operator commands or preferences, system parameters synergies, configuration suggestions and area network styles for interpreting said suggestions is provided.

Further the present invention enables combining the above-mentioned extensions to produce intermediate gateway-independent gateway-interpretable configuration suggestions on the M2M platform, i.e. the M2M backend, and suggestion-aware gateway-specific configuration values on the M2M gateways itself.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for configuring an M2M system comprising an M2M frontend with one or more gateways and an M2M backend, the method comprising:
   a) specifying, by an operator entity, one or more commands to be achieved in the M2M system by the one or more gateways of the M2M frontend,
   b) specifying, by a stylesheet providing entity, one or more stylesheets for the one or more gateways of the M2M frontend representing information for interpretation of general gateway configurations for the one or more gateways,
   c) calculating, by a synergy description entity, one or more synergy descriptions representing an impact of one or more gateway operational parameters on the specified commands,
   d) calculating the general gateway configurations for a plurality of gateways by evaluating the synergy descriptions with respect to the specified commands by a configuration entity, and
   e) providing specific gateway configurations by applying the specified stylesheets on the general gateway configurations by a gateway management entity.

2. The method according to claim 1, wherein the commands are generated by at least one of a prioritization of verticals or geographic information for gateways (GW).

3. The method according to claim 1, wherein the specified commands are auto-generated.

4. The method according to claim 3, wherein the commands are auto-generated by a GUI for the operator entity.

5. The method according to claim 1, wherein the calculating the gateway general configurations comprises at least one of weighing commands or determining a target level to be achieved is determined for the specified commands.

6. The method according to claim 5, wherein a most valuable entry is determined for each of the one or more gateway operational parameters for the specified commands.

7. The method according to claim 6, wherein the most valuable entry of each of the one or more gateway operational parameters for each of the specified commands is selected based on the highest value for each of the one or more gateway operational parameters throughout all of the specified commands.

8. The method according to claim 6, wherein the most valuable entry is calculated based on the target level to be achieved and a corresponding weight for each of the specified commands.

9. The method according to claim 5, wherein prior to step d), correlations between each pair of two commands are calculated and one or more best commands having a highest correlation are selected for performing steps d)-e) to achieve the determined target level.

10. The method according to claim 1, further comprising sorting each of the specified commands based on a weight and based on a list of sorted commands in descending order with a first command in the list having a highest weight; and
choosing a corresponding most valuable entry of a gateway operational parameter not already determined for each of said commands to determine the gateway general configuration.

11. The method according to claim 1, further comprising:
aa) calculating target achievement values for each specified command,
bb) selecting, based on the target achievement values for each specified command, one or more values of gateway operational parameters,
cc) calculating one or more degrees of target achievement,
dd) comparing, for each specified command, a corresponding calculated degree and a corresponding target achievement value,
ee) selecting, based on the comparisons, a selected command having a maximum difference between calculated degrees of target achievement and target achievement values which has not previously been selected,
ff) calculating benefits for the values of the gateway operational parameters for the selected command,
gg) selecting the value of the corresponding gateway operational parameter having the highest benefit as a value for the gateway operational parameter for the gateway general configuration,
hh) perform steps cc)-gg) with a non-selected command as long as all values for all gateway operational parameters have been determined to define the gateway general configuration.

12. The method according to claim 11, wherein when calculating the degrees of target achievement, weights of the corresponding command are included.

13. The method according to claim 1, wherein prior to step d), correlations between each pair of two specified commands are calculated and negative correlating commands are filtered.

14. The method according to claim 1, wherein external influences of the gateway operational parameters are included when determining the one or more synergy descriptions.

15. An M2M system comprising an M2M backend and an M2M frontend with one or more gateways, the M2M system comprising:
a) an operator entity adapted to specify one or more commands to be achieved in the M2M system by the one or more gateways of the M2M frontend,
b) a stylesheet providing entity adapted to specify one or more stylesheets for the one or more gateways of the M2M frontend representing information for interpretation of general gateway configurations for the one or more gateways,
c) a synergy description entity adapted to calculate one or more synergy descriptions representing an impact of one or more gateway operational parameters on the specified commands,
d) a configuration entity adapted to calculate the general gateway configurations for a plurality of gateways by evaluating the synergy descriptions with respect to the specified commands, and
e) a gateway management entity adapted to provide specific gateway configurations by applying the specified stylesheets on the determined general gateway configurations.

16. The method according to claim 15, wherein the configuration entity is a file server.

* * * * *